US010009140B2

(12) United States Patent
Yu

(10) Patent No.: US 10,009,140 B2
(45) Date of Patent: Jun. 26, 2018

(54) SENSING DEVICE AND METHOD AND SYSTEM FOR INFORMATION TRANSFER THEREOF

(71) Applicant: Research Cooperation Foundation of Yeungnam University, Gyeongsangbuk-do (KR)

(72) Inventor: Hee Jung Yu, Gyeongsangbuk-do (KR)

(73) Assignee: RESEARCH COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 0 days. days.

(21) Appl. No.: 15/702,702

(22) Filed: Sep. 12, 2017

(65) Prior Publication Data

US 2018/0083728 A1 Mar. 22, 2018

(30) Foreign Application Priority Data

Sep. 12, 2016 (KR) ........................ 10-2016-0117419

(51) Int. Cl.

*H04K 3/00* (2006.01)
*H04M 3/16* (2006.01)
*H04M 3/42* (2006.01)

(52) U.S. Cl.

CPC ........... *H04K 3/60* (2013.01); *H04K 2203/32* (2013.01)

(58) Field of Classification Search

CPC ............................. H04K 3/60; H04K 2203/32
USPC .................................. 455/1, 410, 411, 414.1
See application file for complete search history.

(56) References Cited

U.S. PATENT DOCUMENTS

| | | | | |
|---|---|---|---|---|
| 9,258,078 | B2 * | 2/2016 | Kang | H04K 3/827 |
| 2015/0031283 | A1 * | 1/2015 | Francesco | H04K 3/415 455/1 |
| 2015/0244495 | A1 * | 8/2015 | Kang | H04K 3/827 455/1 |

FOREIGN PATENT DOCUMENTS

| | | |
|---|---|---|
| KR | 10-1532748 B1 | 6/2015 |

* cited by examiner

*Primary Examiner* — Tilahun B Gesesse
(74) *Attorney, Agent, or Firm* — The PL Law Group, PLLC

(57) ABSTRACT

An information transmission system includes a first sensing device configured to transmit a cooperation request signal, receive a cooperation response signal corresponding to the cooperation request signal, generate a jamming signal on the basis of the cooperation response signal, and generate and transmit a transmission signal including sensor information; an information collection device configured to receive the transmission signal transmitted by the first sensing device; and at least one second sensing device provided near the first sensing device, and configured to receive the cooperation request signal and transmit the cooperation response signal corresponding to the cooperation request signal to the first sensing device. The cooperation response signal includes channel information between the at least one second sensing device and the information collection device, and a seed for a random signal generator shared between the first sensing device and the at least one second sensing device.

17 Claims, 6 Drawing Sheets

SENSING DEVICE AND METHOD AND SYSTEM FOR INFORMATION TRANSFER THEREOF

CROSS REFERENCE TO RELATED APPLICATIONS AND CLAIM OF PRIORITY

This application claims priority to and the benefit of Korean Patent Application No. 10-2016-0117419, filed on Sep. 12, 2016, the disclosure of which is incorporated herein by reference in its entirety.

BACKGROUND

1. Technical Field

The present disclosure relates to a wireless network security technology, and more particularly, to a sensing device and an information transmission method and system using the same.

2. Background Art

Recently, as use of internet-of-things (IoT) technology has been increasing, wireless sensor networks collecting information using single-antenna sensors have been increasing in use. In many cases, sensor information collected and transmitted by a sensor in the wireless sensor network includes data highly related to the public.

Generally, sensors for use in a wireless sensor network are produced at low costs and do not include a plurality of antennas. Accordingly, most sensors include a single antenna.

It is highly probable that sensor information transmitted by a sensor with a single antenna will be wiretapped by a surrounding wiretapping device. Therefore, data highly related to the public is likely to be frequently wiretapped from outside.

SUMMARY

Embodiments of the present disclosure are directed to a sensing device capable of transmitting a jamming signal in cooperation with other single-antenna sensing devices in order to not expose sensor information to the outside, and an information transmission method and system using the sensing devices.

According to an aspect of the present disclosure, an information transmission system includes a first sensing device configured to transmit a cooperation request signal, receive a cooperation response signal corresponding to the cooperation request signal, generate a jamming signal on the basis of the cooperation response signal, and generate and transmit a transmission signal including sensor information; an information collection device configured to receive the transmission signal transmitted by the first sensing device; and at least one second sensing device provided near the first sensing device, and configured to receive the cooperation request signal, and transmit the cooperation response signal corresponding to the cooperation request signal to the first sensing device. The cooperation response signal includes channel information between the at least one second sensing device and the information collection device; and a seed for a random signal generator shared between the first sensing device and the at least one second sensing device.

The first sensing device may calculate a beamforming coefficient, which is to be used to generate a jamming signal, using channel information between the first sensing device and the information collection device, channel information between the at least one second sensing device and the information collection device, and a seed for a random signal generator shared between the first sensing device and the at least one second sensing device using Equation 1 below:

$$H=[h_1 h_2],$$

wherein H represents a first channel matrix, $h_1$ represents the channel information between the first sensing device and the information collection device, and $h_2$ represents the channel information between the at least one second sensing device and the information collection device.

The first sensing device may generate a beamforming vector, which is to be used to transmit the jamming signal, using Equation 2 below:

$$v=\begin{bmatrix} V_1 \\ 1 \end{bmatrix},$$

wherein $v_1$ represents a beamforming coefficient of the first sensing device, and 1 represents a beamforming coefficient of the at least one second sensing device.

The first sensing device may calculate the beamforming coefficient of the first sensing device satisfying Equation 3 below:

$$Hv=b_1 v_1+h_2=0$$

The first sensing device may transmit an integration signal including the jamming signal and the transmission signal via a single antenna, wherein the integration signal may be generated using Equation 4 below:

$$x_1=\alpha s+v_1 p,$$

wherein α represents a constant for adjusting power for sensor information of the first sensing device, and p represents a jamming signal.

The information collection device may receive a signal obtained by Equation 5 below according to the integration signal transmitted by the first sensing device and the jamming signal transmitted by the at least one second sensing device:

$$y=H\begin{bmatrix} X_1 \\ X_2 \end{bmatrix}=\alpha h_1 s+Hvp+n=\alpha h_1 s+n,$$

wherein n represents reception noise, and $\alpha h_1 s+Hvp+n$ represents $\alpha h_1 s+n$ according to Equation 3 above.

The information transmission system may further include a wiretapping device configured to receive a signal calculated by Equation 6 below from the first sensing device and the at least one second sensing device:

$$y'=G\begin{bmatrix} X_1 \\ X_2 \end{bmatrix}=\alpha g_1 s+Gvp+n=\alpha g_1 s+(g_1 v_1+g_2)+n,$$

wherein G represents a second channel matrix which is a 1×2 matrix defined by channel information between the first sensing device and the wiretapping device and channel information between a sensing device adjacent to the first sensing device among the at least one sensing device and the wiretapping device, wherein $G=[g_1\ g_2]$.

The first sensing device may calculate a beamforming coefficient of the jamming signal such that a signal-to-interference-plus-noise ratio (SINR) of the transmission signal received by the information collection device is maintained to be greater than or equal to a predetermined value when the transmission signal and the jamming signal are transmitted.

The at least one second sensing device may generate the same jamming signal as that generated by the first sensing device, and transmit the jamming signal while the first sensing device transmits the jamming signal.

When the cooperation request signal is received from the first sensing device, the at least one second sensing device may determine whether the at least one second sensing device will cooperate with the first sensing device by checking at least one among remaining battery power, an information transmission load, and network traffic thereof, and transmit the cooperation response signal to the first sensing device.

According to another aspect of the present disclosure, a device which transmits sensor information via a single antenna includes at least one processor; a memory; and at least one program. The at least one program may be stored in the memory, and configured to be executed by the at least one processor. The at least one program may include a command instructing to transmit a cooperation request signal; a command instructing to receive a cooperation response signal corresponding to the cooperation request signal and generate a jamming signal on the basis of the cooperation response signal; and a command instructing to generate a transmission signal including sensor information. The cooperation response signal may include channel information between a second sensing device and an information collection device; and a seed for a random signal generator shared between a first sensing device and the second sensing device.

The command instructing to generate the jamming signal may include a command instructing, when the transmission signal and the jamming signal are transmitted, to calculate a beamforming coefficient of the jamming signal such that a signal-to-interference-plus-noise ratio (SINR) of the transmission signal received by the information collection device is maintained to be greater than or equal to a predetermined value.

According to another aspect of the present disclosure, a device which transmits a jamming signal via a single antenna includes at least one processor; a memory; and at least one program. The at least one program may be stored in the memory, and configured to be executed by the at least one processor. The at least one program may include a command instructing to receive a cooperation request signal from at least one sensing device adjacent to the device; a command instructing to check whether the device will cooperate with the at least one sensing device on the basis of the received cooperation request signal, and control the device to generate a cooperation response signal including channel information between the device and the information collection device and transmit the generated cooperation response signal to the at least one sensing device; and a command instructing to generate a jamming signal according to a beamforming coefficient calculated by the at least one sensing device and transmit the generated jamming signal to the information collection device.

The command instructing to generate and transmit the jamming signal may include a command instructing to generate the same jamming signal as that generated by the first sensing device, and transmit the jamming signal while the sensing device transmits the jamming signal.

The command instructing to check whether the device will cooperate with the at least one sensing device and transmit the cooperation response signal may include a command instructing, when the cooperation request signal is received from the at least one sensing device, to determine whether the device will cooperate with the at least one sensing device by checking at least one among remaining battery power, an information transmission load, and network traffic of the device, and transmit the cooperation response signal to the at least one sensing device.

According to another aspect of the present disclosure, an information transmission method, performed by a first sensing device, includes transmitting a cooperation request signal; receiving a cooperation response signal corresponding to the cooperation request signal, and generating a jamming signal on the basis of the cooperation response signal; and generating a transmission signal including sensor information. The cooperation response signal may include channel information between a second sensing device and an information collection device; and a seed for a random signal generator shared between the first sensing device and the second sensing device.

According to an embodiment, sensor information transmitted by a sensing device may be prevented from being wiretapped by an external wiretapping device by transmitting a jamming signal in cooperation with single-antenna sensing devices.

BRIEF DESCRIPTION OF DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Hereinafter, embodiments of the present disclosure will be described in detail with reference to FIGS. 1 through 6 below. However, these embodiments are only examples and thus the present disclosure is not limited thereto.

In describing embodiments of the present disclosure, well-known techniques related to the present disclosure are not described in detail if it is determined that they would obscure the present disclosure due to unnecessary detail. Terms used herein have been defined in consideration of functions of the present disclosure and may thus vary according to an intention of a user or an operator, a precedent, etc. Accordingly, it will be understood that the terms should be defined on the basis of the context of the specification.

The scope of the present disclosure should be defined by the appended claims, and embodiments set forth herein are only means for efficiently explaining the technical idea of the present disclosure to those of ordinary skill in the art.

In the following description, terms “transmit”, “communicate”, “send”, “receive” and other terms having a similar meaning should be understood to mean transmission of a signal or information from an element to another element directly or via another element. Particularly, “transmitting” or “sending” a signal or information should be understood to indicate a final destination of the signal or information rather than a direct passage. This also applies to “receiving” a signal or information. In the detailed description, if two or more pieces of data or information are referred to as being “associated” with each other, it will be understood that, when a piece of data (or information) is obtained, at least a part of a piece of another data (or information) may be obtained on the basis of the obtained piece of data (or information).

Figure 1:
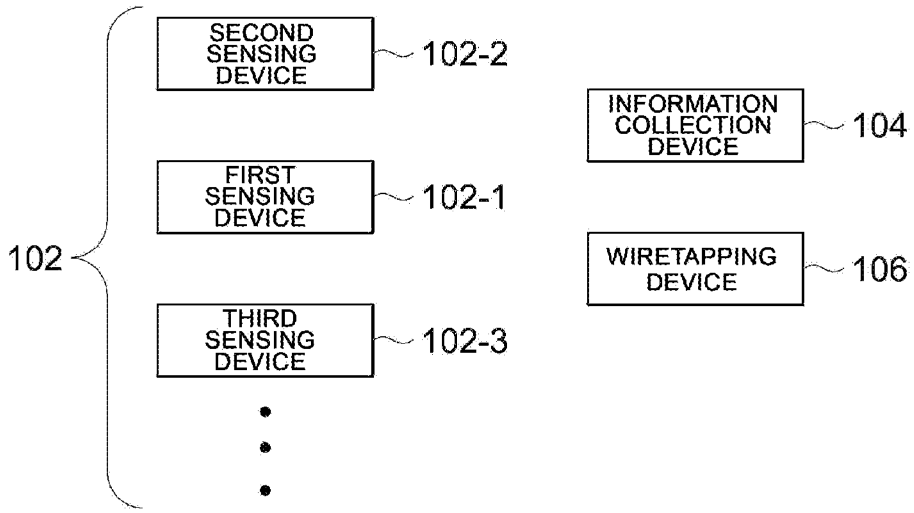
FIG. 1 is a configuration diagram of a wireless sensor network system according to an embodiment of the present disclosure.

FIG. 1 is a configuration diagram of a wireless sensor network system according to an embodiment of the present disclosure.

Referring to FIG. 1, a wireless sensor network system 100 according to an embodiment of the present disclosure may include a plurality of sensing devices 102 and an information collection device 104.

The wireless sensor network system 100 may refer to a communication network via which sensor information, (e.g., situational information of surroundings such as temperature, humidity, vibration, etc.) sensed by the plurality of sensing devices 102 is transmitted to the information collection device 104 at a location on which a user has installed the plurality of sensing devices 102. The plurality of sensing devices 102 may transmit the sensor information to the information collection device 104 via a wireless network. The wireless sensor network system 100 according to an embodiment of the present disclosure will be described with respect to a case in which, when the sensing device 102 transmits sensor information to the information collection device 104, the sensor information transmitted by the sensing device 102 is wiretapped by a wiretapping device 106.

The sensing device 102 may sense situational information of surroundings at the location on which the sensing device 102 is installed, and transmit the sensed sensor information to the information collection device 104. In detail, the sensing device 102 may generate the sensor information by sensing the situational information of surroundings, such as temperature, humidity, vibration, etc., at the location thereof.

The sensing device 102 may transmit the sensor information to the information collection device 104 via a single antenna thereof. In detail, when transmitting the sensor information to the information collection device 104, the sensing device 102 transmits a jamming signal in cooperation with another sensing device adjacent thereto so as to prevent the sensor information from being wiretapped by the wiretapping device 106. Here, the jamming signal may refer to a signal obstructing the wiretapping device 106 from receiving a signal so that the wiretapping device 106 may not be able to wiretap the sensor information transmitted to the information collection device 104. A first sensing device 102-1 transmitting sensor information to the information collection device 104 will be described below.

The first sensing device 102-1 which will generate and transmit sensor information to the information collection device 104 may transmit a cooperation request signal to other sensing devices 102-2 and 102-3 adjacent thereto so as to transmit the sensor information to the information collection device 104. Here, the cooperation request signal may refer to a signal requesting transmission of a jamming signal to prevent the sensor information from being wiretapped by the wiretapping device 106 when the first sensing device 102-1 transmits the sensor information to the information collection device 104.

The other sensing devices (e.g., the second sensing device 102-1 and the third sensing device 102-3) located adjacent to the first sensing device 102-1 and receiving the cooperation request signal from the first sensing device 102-1 may determine whether they may cooperate with the first sensing device 102-1, in response to the cooperation request signal. In detail, the second sensing device 102-2 and the third sensing device 102-3 may determine whether they may cooperate with the first sensing device 102-1 by checking remaining battery power, an information transmission load, network traffic, etc. at a time point when the cooperation request signal is received. After determining whether the second sensing device 102-2 and the third sensing device 102-3 may cooperate with the first sensing device 102-1, the second sensing device 102-2 and the third sensing device 102-3 may transmit a cooperation response signal, which includes whether the second sensing device 102-2 and the third sensing device 102-3 may cooperate with the first sensing device 102-1, to the first sensing device 102-1. If the second sensing device 102-2 and the third sensing device 102-3 may cooperate with the first sensing device 102-1, the second sensing device 102-2 and the third sensing device 102-3 may transmit the cooperation response signal including channel information thereof (in detail, channel information of the second sensing device 102-2 and the third sensing device 102-3), basic information for generating a jamming signal (e.g., a seed for a random signal generator shared by the plurality of sensing devices 102), etc. to the first sensing device 102-1. Here, the channel information may include a value indicating a degree of distortion occurring in a channel for transmission of a signal from each of the plurality of sensing devices 102 to the information collection device 104.

The first sensing device 102-1 may check whether there is a sensing device that may cooperate with the first sensing device 102-1 among the second and third sensing devices 102-2 and 102-3 adjacent thereto. In detail, the first sensing device 102-1 may determine whether there is a sensing device that may cooperate with the first sensing device 102-1 by checking the cooperation response signals received from the second sensing device 102-2 and the third sensing device 102-3 adjacent thereto.

If there is a sensing device that may cooperate with the first sensing device 102-1 among the second and third sensing devices 102-2 and 102-3, the first sensing device 102-1 may calculate a beamforming coefficient to be used to transmit a jamming signal. In detail, the first sensing device 102-1 may calculate the beamforming coefficient to be used to transmit the jamming signal from first channel information $h_1$ thereof, second channel information $h_2$ included in the cooperation response signal received from a sensing device that may cooperate with the first sensing device 102-1, and the basic information for generating the jamming signal.

The first sensing device 102-1 may beamform the jamming signal in cooperation with another sensing device adjacent thereto and transmit the jamming signal, so that the jamming signal may reach only the wiretapping device 106 and not the information collection device 104.

First, the first sensing device 102-1 may generate a 1×2 first channel matrix H using the first channel information $h_1$ and the second channel information $h_2$, as expressed in Equation 1 below.

$$H=[h_1 h_2] \quad \text{[Equation 1]}$$

The first sensing device 102-1 may calculate beamforming coefficients of the first sensing device 102-1 and the second sensing device 102-2 using Equation 2 below. The first sensing device 102-1 and the second sensing device 102-2 transmit the same jamming signal according to the basic information for generating the jamming signal (e.g., a seed for a random signal generator shared by the plurality of sensing devices 102) which is shared therebetween. The sensing devices 102-1 and 102-2 beamform and transmit a transmission signal. In this case, a beamforming vector v may be expressed by Equation 2 below.

$$v=\begin{bmatrix} V_1 \\ 1 \end{bmatrix}, \quad \text{[Equation 2]}$$

wherein $v_1$ represents a first beamforming coefficient used by the first sensing device 102-1, and 1 represents a second beamforming coefficient which is used by the second sensing device 102-2 and which may indicate that the second sensing device 102-2 directly transmits a transmission signal. Here, although it is described that the second beamforming coefficient of the second sensing device 102-2 is 1, the second beamforming coefficient is not limited thereto and may be set as another constant (e.g., $v_2$). In this case, the beamforming vector v may be multiplied by a constant c. In this case, the constant c may be set as a reciprocal (i.e., $1/v_2$) of the second beamforming coefficient (i.e., $v_2$) of the second sensing device 102-2, so that $v_2$ may be 1.

The first sensing device 102-1 may calculate the first beamforming coefficient $v_1$ satisfying Equation 3 below.

$$Hv=h_1 v_1+b_2=0 \quad \text{[Equation 3]}$$

When the first sensing device 102-1 and the second sensing device 102-2 transmit a jamming signal, the jamming signal may be multiplied by the beamforming coefficients $v_1$ and $v_2$ (here, 1) of the beamforming vector v expressed in Equation 2 above, and be transmitted to the information collection device 104 via channels $h_1$ and $h_2$ of the first sensing device 102-1 and the second sensing device 102-2. Therefore, the jamming signal received by the information collection device 104 is $h_1*v_1*a+h_2*1*a$. If Equation 3 above satisfies 0, the jamming signal may not reach the information collection device 104.

That is, the first sensing device 102-1 may beamform the jamming signal using the first beamforming coefficient $v_1$ satisfying Equation 3 above, so that the jamming signal may not reach the information collection device 104. Since the jamming signal is generated using the seed for the random signal generator shared between the first sensing device 102-1 and the second sensing device 102-2, the first sensing device 102-1 and the second sensing device 102-2 may transmit the same jamming signal.

The first sensing device 102-1 may generate a first integration signal $x_1$ according to Equation 4 below to simultaneously transmit sensor information s and the beamformed jamming signal to the information collection device 104.

$$x_1=\alpha s+v_1 p, \quad \text{[Equation 4]}$$

wherein α may represent a constant for adjusting power of the sensor information s, and p may represent the jamming signal.

That is, the first sensing device 102-1 may adjust power between the sensor information s and the jamming signal p by multiplying the sensor information s by the constant α, thereby controlling the performance of physical layer security In this case, a second integration signal $x_2$ transmitted by the second sensing device 102-2 may be expressed by Equation 5 below.

$$x_2=p \quad \text{[Equation 5]}$$

A reception signal y received by the information collection device 104 may be expressed by Equation 6 below according to Equations 1 to 5 above.

$$y=H\begin{bmatrix} X_1 \\ X_2 \end{bmatrix}=\alpha h_1 s+Hvp+n=\alpha h_1 s+n, \quad \text{[Equation 6]}$$

wherein n may represent reception noise.

In this case, ($\alpha h_1 s+Hvp+n$) expressed in Equation 6 may be expressed as ($\alpha h_1 s+n$) according to Equation 3 above.

If the wiretapping device 106 is present in the wireless sensor network system 100, a wiretapped reception signal received by the wiretapping device 106 may be expressed by Equation 7 below.

$$y'=G\begin{bmatrix} X_1 \\ X_2 \end{bmatrix}=\alpha g_1 s+Gvp+n=\alpha g_1 s+(g_1 v_1+g_2)+n, \quad \text{[Equation 7]}$$

wherein G may represent a second channel matrix, i.e., a 1×2 matrix (in detail, $G=[g_1\ g_2]$) of third channel information $g_1$ from the first sensing device 102-1 to the wiretapping device 106 and fourth channel information $g_2$ from the second sensing device 102-2 to the wiretapping device 106.

A comparison between the reception signal y received by the information collection device 104 and a wiretapped reception signal y' received by the wiretapping device 106 reveals that the jamming signal remains as interference in the wiretapped reception signal y' received by the wiretapping device 106, unlike in the reception signal y.

The first sensing device 102-1 transmits the sensor information omni-directionally, but the jamming signal transmitted by the first sensing device 102-1 and the second sensing device 102-2 may be transmitted with directivity according to a beamforming coefficient calculated as described above.

Thus, the information collection device 104 of the wireless sensor network system 100 is not influenced by the jamming signal and may thus maintain a certain signal-to-interference-plus-noise ratio (SINR). On the other hand, an SINR of the wiretapping device 106 is decreased due to the jamming signal, and thus the wiretapping device 106 cannot demodulate and decode a signal to be wiretapped (that is, the sensor information of the first sensing device 102-1). Accordingly, physical layer security of the wireless sensor network system 100 is enhanced.

Figure 2:
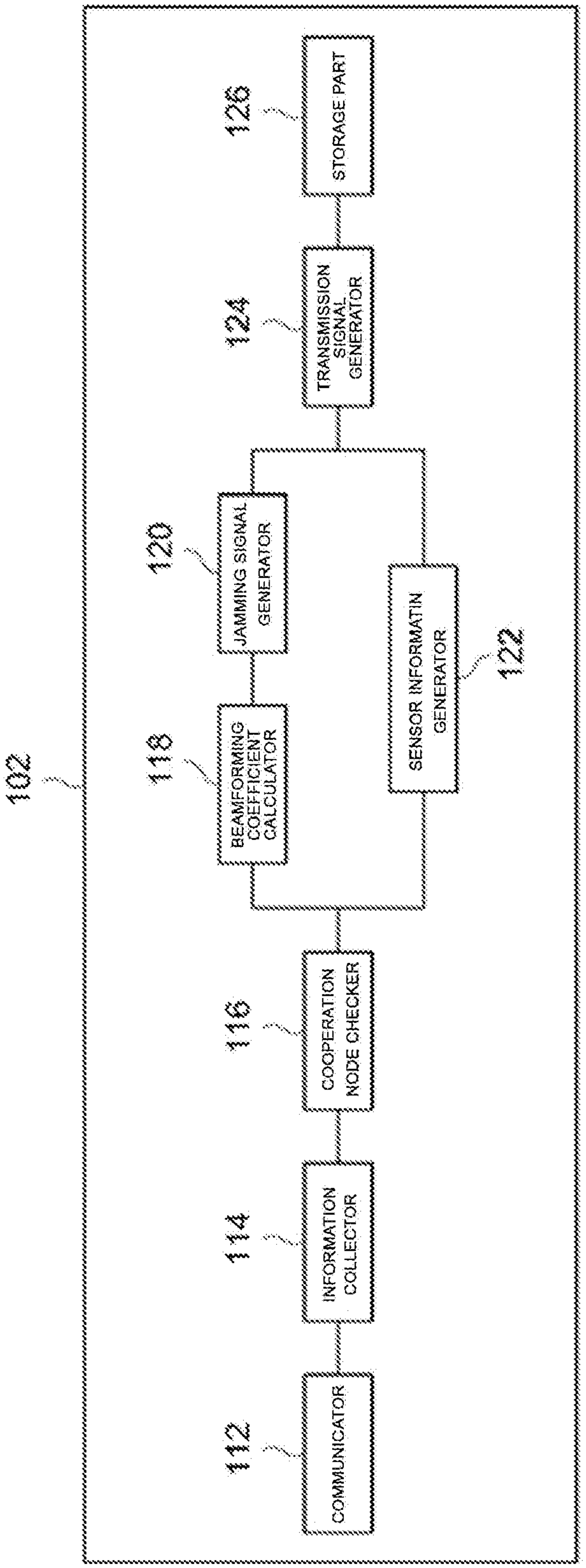
FIG. 2 is a block diagram of a sensing device according to an embodiment of the present disclosure.

FIG. 2 is a block diagram of a sensing device according to an embodiment of the present disclosure.

Referring to FIG. 2, a sensing device 102 according to an embodiment of the present disclosure may include a communicator 112, an information collector 114, a cooperation node checker 116, a beamforming coefficient calculator 118, a jamming signal generator 120, a sensor information generator 122, a transmission signal generator 124, and a storage part 126.

The communicator 112 may communicate with other sensing devices adjacent to the sensing device 102 and the information collection device 104 of FIG. 1. In detail, the communicator 112 may communicate with the other sensing devices and the information collection device 104 via a wireless network using a single antenna of the sensing device 102.

The communicator 112 may transmit a cooperation request signal to or receive a cooperation request signal from another sensing device adjacent to the sensing device 102, or may transmit a cooperation response signal to or receive a cooperation response signal from another sensing device adjacent to the sensing device 102. Furthermore, the communicator 112 may transmit sensor information collected by the information collector 114 to the information collection device 104. For example, the communicator 112 may transmit the sensor information to the information collection device 104 according to a broadcasting method. Furthermore, the communicator 112 may transmit a jamming signal generated by the jamming signal generator 120. Here, the communicator 112 may transmit the jamming signal generated by the jamming signal generator 120 in a direction determined according to a beamforming coefficient calculated by the beamforming coefficient calculator 118, as will be described below. Here, an example in which the communicator 112 communicates with other sensing devices adjacent to the sensing device 102 and the information collection device 104 has been described, and embodiments are not limited thereto. The communicator 112 may establish various communications with other sensing devices adjacent to the sensing device 102 and the information collection device 104.

The information collector 114 may collect information on surroundings. In detail, the information collector 114 may sense information at a location on which the sensing device 102 is installed using various sensors (e.g., a temperature sensor, a humidity sensor, etc.) of the sensing device 102.

The cooperation node checker 116 may transmit a cooperation request signal to other sensing devices adjacent to the sensing device 102. In detail, when the information collector 114 generates sensor information, the cooperation node checker 116 may transmit the cooperation request signal to the other sensing devices to enhance security of transmission of the sensor information. The cooperation request signal may refer to a signal for requesting transmission of a jamming signal to prevent sensor information from being wiretapped by the wiretapping device 106 when the sensing device 102 transmits the sensor information to the information collection device 104.

The cooperation node checker 116 may check a cooperation response signal received by the communicator 112 as a response to the transmitted cooperation request signal. Here, the cooperation response signal is a signal including channel information of the other sensing devices adjacent to the sensing device 102, basic information for generating a jamming signal (e.g., a seed for a random signal generator shared by the plurality of sensing devices 102 of FIG. 1), etc., and may refer to a signal indicating whether the other sensing devices will transmit a jamming signal together. The channel information is a channel value for transmission of a signal from the plurality of devices 102 to the information collection device 104, and may refer to a value representing distortion of a transmission signal caused by a channel between the first sensing device 102-1 and the information collection device 104.

When the communicator 112 receives a cooperation request signal from another sensing device adjacent to the sensing device 102, the cooperation node checker 116 may determine whether the sensing device 102 may cooperate with the other sensing device. In detail, the cooperation node checker 116 may determine whether the sensing device 102 may cooperate with the other sensing device by checking remaining battery power, an information transmission load, network traffic, etc. at a time point when the cooperation request signal is received and generate the cooperation response signal.

The beamforming coefficient calculator 118 may calculate a beamforming coefficient used to transmit a jamming signal. In detail, the beamforming coefficient calculator 118 may calculate the beamforming coefficient used for the jamming signal generator 120 to generate the jamming signal. The beamforming coefficient calculator 118 may calculate the beamforming coefficient using channel information of each of other adjacent sensing devices and basic information for generating the jamming signal (e.g., a seed for a random signal generator shared by the plurality of sensing devices 102) which are included in the cooperation response signals received from the other sensing devices. Although it is described here that the sensing device 102 transmitting the sensor information calculates a beamforming coefficient and generates a jamming signal using the channel information of other sensing devices and the basic information for generating a jamming signal, embodiments are not limited thereto. The sensing device 102 may transmit channel information thereof and basic information for generating a jamming signal to other sensing devices adjacent thereto, and the other sensing devices may generate the same jamming signal.

The jamming signal generator 120 may generate the jamming signal such that the wiretapping device 106 may not wiretap sensor information. In detail, when sensor information generated by the information collector 114 is transmitted, the jamming signal generator 120 may generate the jamming signal using a beamforming coefficient calculated by the beamforming coefficient calculator 118 so that the wiretapping device 106 may not wiretap the transmitted sensor information. Here, the jamming signal may refer to a signal obstructing the wiretapping device 106 from receiving a signal to prevent the wiretapping device 106 from wiretapping the sensor information transmitted to the information collection device 104.

The sensor information generator 122 may generate sensor information using information collected by the information collector 114. In detail, the sensor information generator 122 may generate the sensor information to be transmitted to the information collection device 104 using the information collected by the information collector 114.

The transmission signal generator 124 may generate a transmission signal to be transmitted by the sensing device 102. In detail, the transmission signal generator 124 may generate a transmission signal to be transmitted by the sensing device 102 via a single antenna using the jamming signal generated by the jamming signal generator 120 and the sensor information generated by the sensor information generator 122.

The storage part 126 may store various types of information used by the sensing device 102. In detail, the storage part 126 may store basic information for generating a jamming signal and for use in the jamming signal generator 120 in generating the jamming signal. Furthermore, the storage part 126 may store channel information used when sensor information is transmitted to the information collection device 104.

Here, only representative examples of information stored in the storage part 126 are described, and embodiments are not limited thereto. The storage part 126 may store all information that may be stored in the sensing device 102.

Figure 3:
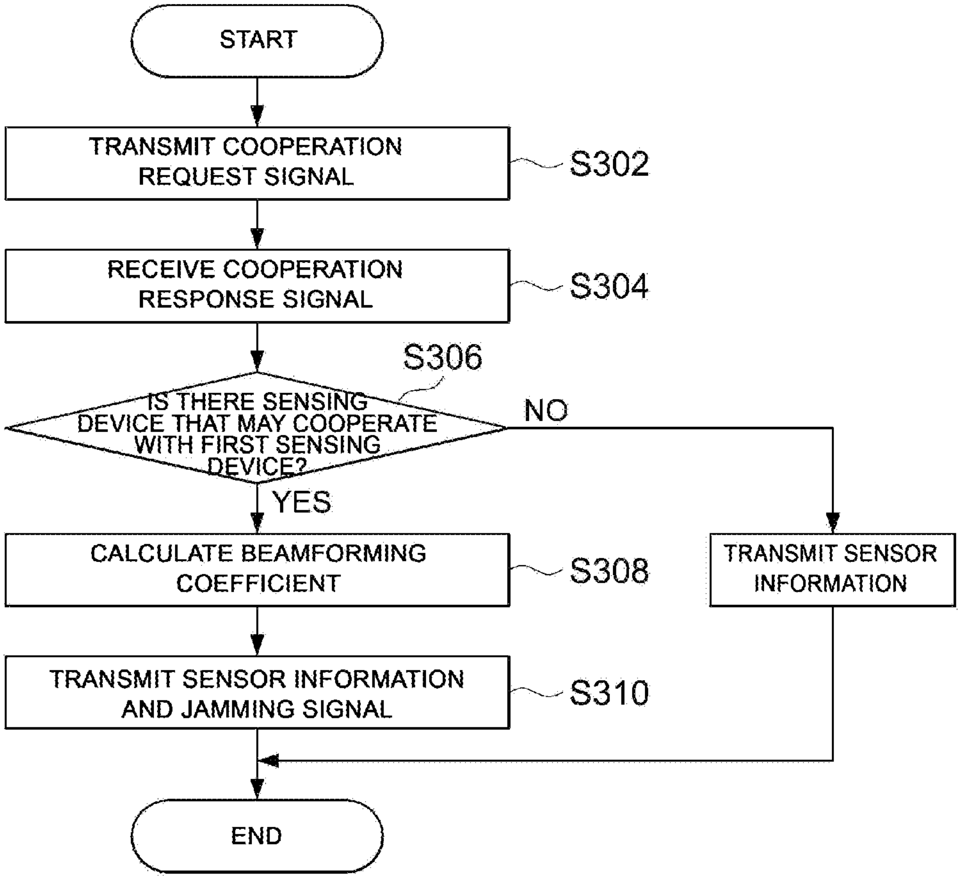
FIG. 3 is a flowchart of a method of transmitting sensor information according to an embodiment of the present disclosure.

FIG. 3 is a flowchart of a method of transmitting sensor information according to an embodiment of the present disclosure. In the drawing, the method is illustrated as being divided into a plurality of operations. However, at least some of the plurality of operations may be performed in an order different from that described herein, may be combined with other operations, may be omitted, may be divided into sub-operations, or may have one or more operations (not shown) added to. Alternatively, in one embodiment, one or more operations (not shown) may be performed together with this method.

Referring to FIG. 3, the first sensing device 102-1 transmits a cooperation request signal to other sensing devices (e.g., the sensing devices 102-2 and 102-3) adjacent thereto (operation S302). In detail, when sensor information is generated and transmitted to the information collection device 104, the first sensing device 102-1 may transmit the cooperation request signal to the other sensing devices 102-2 and 102-3 so as to prevent the sensor information from being wiretapped by the wiretapping device 106.

Next, the first sensing device 102-1 receives a cooperation response signal from the other sensing devices 102-2 and 102-3 (operation S304). In detail, when transmitting the sensor information to the information collection device 104, the first sensing device 101-1 may receive the cooperation response signal indicating whether the other sensing devices 102-2 and 102-3 may cooperate with the first sensing device 102-1.

Next, the first sensing device 102-1 determines whether there is a sensing device that may cooperate with the first sensing device 102-1 among the second and third sensing devices 102-2 and 102-3 (operation S306). If there is no sensing device that may cooperate with the first sensing device 102-1, the first sensing device 102-1 may transmit the sensor information to the information collection device 104.

When it is determined in operation S306 that there is a sensing device that may cooperate with the first sensing device 102-1, the first sensing device 102-1 calculates a beamforming coefficient (operation S308). In detail, the first sensing device 102-1 may calculate the beamforming coefficient, to be used to transmit a jamming signal, using first channel information $h_1$ of the first sensing device 102-1, second channel information $h_2$ included in the cooperation response signal received from the sensing device that may cooperate with the first sensing device 102-1 (e.g., the second sensing device 102-2), and basic information for generating a jamming signal. The first sensing device 102-1 may beamform the jamming signal in cooperation with another sensing device adjacent thereto and transmit the beamformed jamming signal so that the jamming signal may reach only the wiretapping device 106 and not the information collection device 104.

Thereafter, the first sensing device 102-1 transmits the sensor information and the jamming signal (operation S312). In detail, the first sensing device 102-1 may simultaneously transmit the sensor information to be transmitted to the information collection device 104 and the jamming signal for preventing the wiretapping device 106 from wiretapping the sensor information. In this case, the second sensing device 102-2 may also transmit the jamming signal according to the beamforming coefficient calculated in operation S308.

Figure 4:
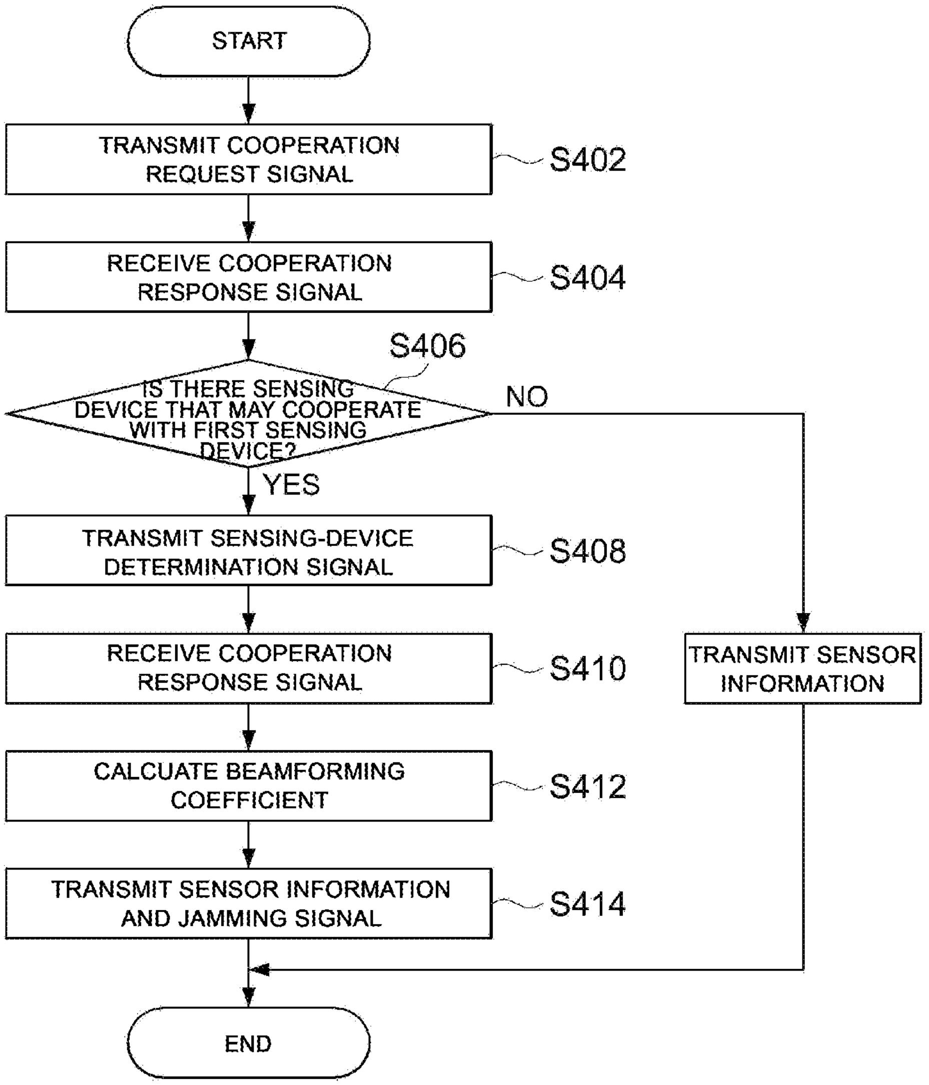
FIG. 4 is a flowchart of a method of transmitting sensor information according to a second embodiment of the present disclosure.

FIG. 4 is a flowchart of a method of transmitting sensor information according to a second embodiment of the present disclosure. In the drawing, the method is illustrated as being divided into a plurality of operations. However, at least some of the plurality of operations may be performed in an order different from that described herein, may be combined with other operations, may be omitted, may be divided into sub-operations, or may have one or more operations (not shown) added thereto. Alternatively, in one embodiment, one or more operations (not shown) may be performed together with this method.

The method of FIG. 4 will be described focusing on parts added to or on differences from the method of transmitting sensor information of FIG. 3 according to an embodiment.

Referring to FIG. 4, the first sensing device 102-1 transmits a cooperation request signal to other sensing devices, e.g., the sensing devices 102-2 and 102-3, adjacent thereto (operation S402).

Next, the first sensing device 102-1 receives a cooperation response signal from the other sensing devices 102-2 and 102-3 (operation S404).

Then, the first sensing device 102-1 checks whether there is a sensing device that may cooperate with the first sensing device 102-1 among the other second and third sensing devices 102-2 and 102-3 (operation S406). If there is no sensing device that may cooperate with the first sensing device 102-1, the first sensing device 102-1 may transmit sensor information to the information collection device 104.

When it is determined in operation S406 that there is a sensing device that may cooperate with the first sensing device 102-1, the first sensing device 102-1 transmits a sensing-device determination signal to the sensing device of which cooperation will be requested (operation S408). In detail, when transmitting the sensor information to the information collection device 104, the first sensing device 102-1 may select a sensing device to cooperate with the first sensing device 102-1 for transmission of a jamming signal together with the first sensing device 102-1, and may transmit the sensing-device determination signal to the selected sensing device.

Next, the first sensing device 102-1 receives a cooperation response signal from the sensing device selected to correspond to the sensing-device determination signal (operation S410). In detail, the first sensing device 102-1 may receive the cooperation response signal including the second channel information $h_2$, basic information for generating a jamming signal, etc. from the selected sensing device.

Next, the first sensing device 102-1 calculates a beamforming coefficient (operation S412). In detail, the first sensing device 102-1 may calculate the beamforming coefficient, to be used to transmit a jamming signal, using first channel information $h_1$ of the first sensing device 102-1, second channel information $h_2$ included in the cooperation response signal received from the selected sensing device, and basic information for generating a jamming signal. The first sensing device 102-1 may beamform and transmit the jamming signal in cooperation with another sensing device adjacent thereto so that the jamming signal may reach only the wiretapping device 106 and not the information collection device 104.

Thereafter, the first sensing device 102-1 transmits the sensor information and the jamming signal (operation S414). In detail, the first sensing device 102-1 may simultaneously transmit the sensor information to be transmitted to the information collection device 104 and the jamming signal for preventing the wiretapping device 106 from wiretapping the sensor information. In this case, the sensing device cooperating with the first sensing device 102-1 (e.g., the second sensing device 102-2) may also transmit a jamming signal according to the beamforming coefficient calculated in operation S412.

Figure 5:
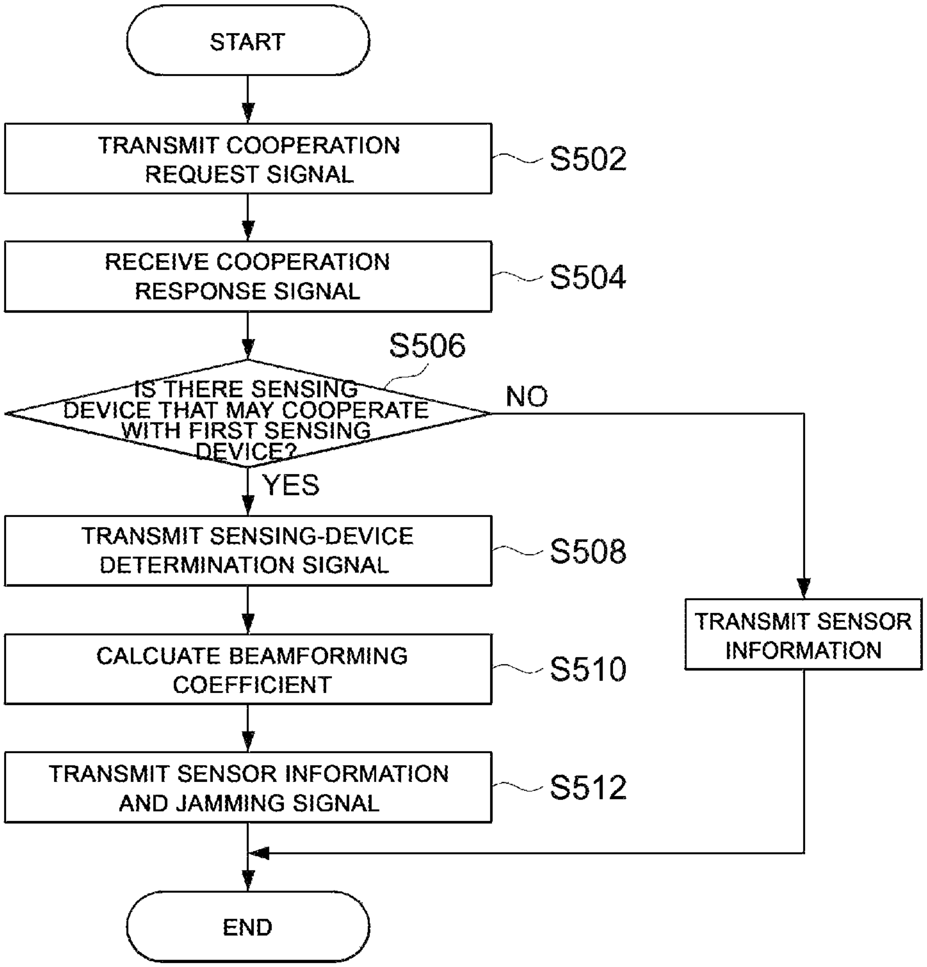
FIG. 5 is a flowchart of a method of transmitting sensor information according to a third embodiment of the present disclosure.

FIG. 5 is a flowchart of a method of transmitting sensor information according to a third embodiment of the present disclosure. In the drawing, the method is illustrated as being divided into a plurality of operations. However, at least some of the plurality of operations may be performed in an order different from that described herein, may be combined with other operations, may be omitted, may be divided into sub-operations, or may have one or more operations (not shown) added thereto. Alternatively, in one embodiment, one or more operations (not shown) may be performed together with this method.

The method of FIG. 5 will be described focusing on parts added to or on differences from the method of transmitting sensor information of FIGS. 3 and 4.

Referring to FIG. 5, the first sensing device 102-1 transmits a cooperation request signal to other sensing devices (e.g., the sensing devices 102-2 and 102-3) adjacent thereto (operation S502).

Next, the first sensing device 102-1 receives a cooperation response signal from the other sensing devices 102-2 and 102-3 adjacent thereto (operation S504).

Next, the first sensing device 102-1 checks whether there is a sensing device that may cooperate with the first sensing device 102-1 among the other second and third sensing devices 102-2 and 102-3 (operation S506). If there is no sensing device that may cooperate with the first sensing device 102-1, the first sensing device 102-1 may transmit sensor information to the information collection device 104.

When it is determined in operation S506 that there is a sensing device that may cooperate with the first sensing device 102-1, the first sensing device 102-1 transmits a sensing-device determination signal to the sensing device of which cooperation will be requested (operation S508). In detail, when transmitting the sensor information to the information collection device 104, the first sensing device 102-1 may select a sensing device to cooperate with the first sensing device 102-1 in transmitting a jamming signal with the first sensing device 102-1, and may transmit the sensing-device determination signal to the selected sensing device. In this case, the sensing-device determination signal may include the first channel information $h_1$ of the first sensing device 102-1 and basic information for generating a jamming signal.

Next, the first sensing device 102-1 calculates a beamforming coefficient (operation S510). In detail, the first sensing device 102-1 may calculate the beamforming coefficient, to be used to transmit a jamming signal, using the first channel information $h_1$ of the first sensing device 102-1 and the basic information for generating a jamming signal. In this case, the sensing device cooperating with the first sensing device 102-1 (e.g., the second sensing device 102-2) may calculate the beamforming coefficient using the sensing-device determination signal received from the first sensing device 102-1.

Thereafter, the first sensing device 102-1 transmits the sensor information and the jamming signal (operation 512). In detail, the first sensing device 102-1 may simultaneously transmit the sensor information to be transmitted to the information collection device 104 and the jamming signal for preventing the wiretapping device 106 from wiretapping the sensor information. In this case, the sensing device cooperating with the first sensing device 102-1 (e.g., the second sensing device 102-2) may also transmit a jamming signal using the calculated beamforming coefficient.

Figure 6:
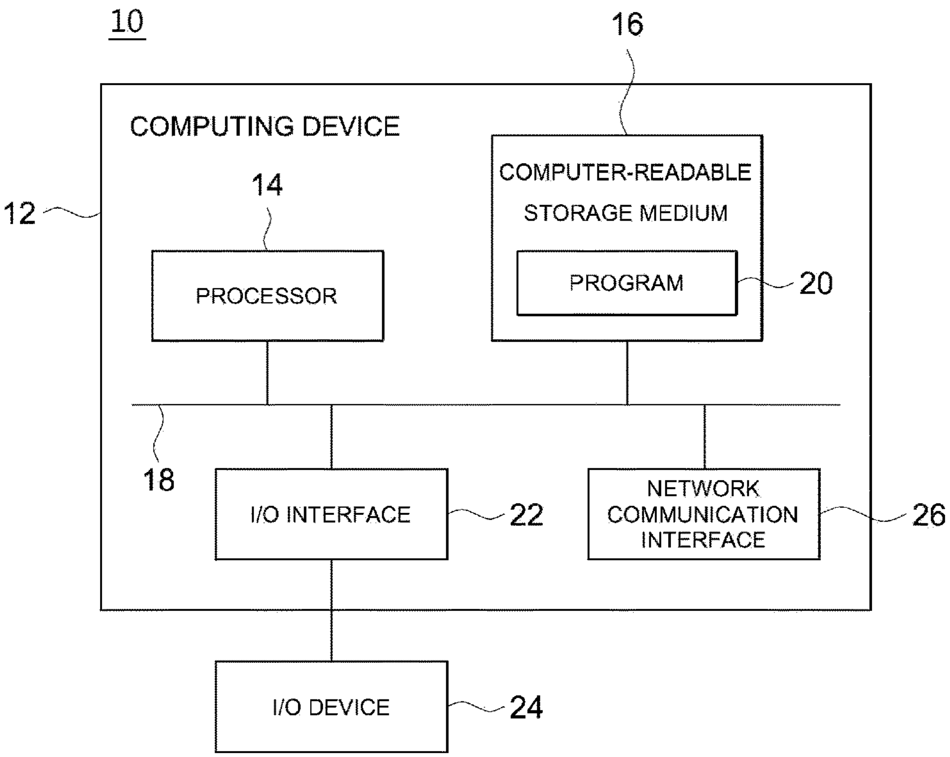
FIG. 6 is a block diagram of an example of a computing environment with a computing apparatus applicable to exemplary embodiments.

FIG. 6 is a block diagram of an example of a computing environment 10 with a computing apparatus applicable to exemplary embodiments. In one embodiment, each component may have other functions or capabilities in addition to those to be described below, and additional components may be further provided in addition to components to be described below.

The computing environment 10 includes a computing device 12. In one embodiment, the computing device 12 may be a device collecting and transmitting information on surroundings (e.g., the first sensing device 102-1) or a device transmitting a jamming signal in cooperation with a device transmitting sensor information (e.g., the first sensing device 102-2 or the third sensing device 102-3).

The computing device 12 includes at least one processor 14, a computer-readable storage medium 16, and a communication bus 18. The at least one processor 14 may control the computing device 12 so that the computing device 12 operates according to the above-described embodiments. For example, the at least one processor 14 may execute one or more programs stored in the computer-readable storage medium 16. The one or more programs may include one or more computer executable commands. When the one or more computer executable commands are executed by the at least one processor 14, the one or more computer executable commands may be configured to, when executed by the at least one processor 14, control the computing device 12 so that the computing device 12 performs operations according to an embodiment.

The computer-readable storage medium 16 is configured to store computer executable commands, program codes, program data and/or other information which is in an appropriate format. A program 20 stored in the computer-readable storage medium 16 includes a set of commands executable by the at least one processor 14. In one embodiment, the computer-readable storage medium 16 may include a memory (a volatile memory such as a random access memory, a non-volatile memory, or an appropriate combination thereof), one or more magnetic disk storage devices, optical disk storage devices, flash memory devices, other type of storage medium accessible by the computing device 12 and capable of storing desired information, or an appropriate combination thereof.

The communication bus 18 connects various components of the computing device 12, such as the one or more processors 14, the computer-readable storage medium 16, etc., to each other.

The computing device 12 may include one or more input/output (I/O) interfaces 22 providing an interface for one or more I/O devices 24, and one or more network communication interfaces 26. The I/O interface 22 and the network communication interface 26 are connected to the communication bus 18. The I/O device 24 may be connected to other components of the computing device 12 via the I/O interface 22. Examples of the I/O device 24 may include an input device such as a pointing device (a mouse, or a trackpad), a keyboard, a touch input device (a touchpad or a touchscreen) a voice or sound input device, various types of sensor devices, and/or a photographing device; and/or an output device such as display device, a printer, a speaker, and/or a network card. An example of the I/O device 24 may be a component of the computing device 12 and included in the computing device 12, or may be a device separate from the computing device 12 and connected to the computing device 12.

Although the present disclosure have been described above in detail with respect to exemplary embodiments thereof, it may be understood by one of ordinary skill in the art that various changes and modifications thereof may be made without departing from the spirit and scope of the present disclosure. Therefore, the scope of the present disclosure is defined not by the embodiments set forth herein, but by equivalents of the appended claims as well as the appended claims.

What is claimed is:

1. An information transmission system comprising:

a first sensing device configured to transmit a cooperation request signal, receive a cooperation response signal corresponding to the cooperation request signal, generate a jamming signal on the basis of the cooperation response signal, and generate and transmit a transmission signal including sensor information;

an information collection device configured to receive the transmission signal transmitted by the first sensing device; and at least one second sensing device provided near the first sensing device, and configured to receive the cooperation request signal, and transmit the cooperation response signal corresponding to the cooperation request signal to the first sensing device, wherein the cooperation response signal comprises:

channel information between the at least one second sensing device and the information collection device; and a seed for a random signal generator shared between the first sensing device and the at least one second sensing device.

2. The information transmission system of claim 1, wherein the first sensing device calculates a beamforming coefficient, which is to be used to generate a jamming signal, using channel information between the first sensing device and the information collection device, channel information between the at least one second sensing device and the information collection device, and a seed for a random signal generator shared between the first sensing device and the at least one second sensing device using the following equation:

$$H=[h_1 h_2],$$

wherein H represents a first channel matrix, $h_1$ represents the channel information between the first sensing device and the information collection device, and $h_2$ represents the channel information between the at least one second sensing device and the information collection device.

3. The information transmission system of claim 2, wherein the first sensing device generates a beamforming vector, which is to be used to transmit the jamming signal, using the following equation:

$$v=\begin{bmatrix} V_1 \\ 1 \end{bmatrix},$$

wherein $v_1$ represents a beamforming coefficient of the first sensing device, and 1 represents a beamforming coefficient of the at least one second sensing device.

4. The information transmission system of claim 3, wherein the first sensing device calculates the beamforming coefficient of the first sensing device satisfying the following equation:

$$Hv=h_1 v_1+h_2=0.$$

5. The information transmission system of claim 4, wherein the first sensing device transmits an integration signal including the jamming signal and the transmission signal via a single antenna, wherein the integration signal is generated using the following equation:

$$x_1=\alpha s+v_1 p,$$

wherein α represents a constant for adjusting power for sensor information of the first sensing device, and p represents a jamming signal.

6. The information transmission system of claim 5, wherein the information collection device receives a signal obtained by the following equation according to the integration signal transmitted by the first sensing device and the jamming signal transmitted by the at least one second sensing device:

$$y=H\begin{bmatrix} X_1 \\ X_2 \end{bmatrix}=\alpha h_1 s+Hvp+n=\alpha h_1 s+n,$$

wherein n represents reception noise, and $\alpha h_1 s+Hvp+n$ represents $\alpha h_1 s+n$.

7. The information transmission system of claim 5, further comprising a wiretapping device configured to receive a signal expressed by the following equation from the first sensing device and the at least one second sensing device:

$$y'=G\begin{bmatrix} X_1 \\ X_2 \end{bmatrix}=\alpha g_1 s+Gvp+n=\alpha g_1 s+(g_1 v_1+g_2)+n,$$

wherein G represents a second channel matrix which is a 1×2 matrix defined by channel information between the first sensing device and the wiretapping device and channel information between a sensing device adjacent to the first sensing device among the at least one sensing device and the wiretapping device, wherein $G=[g_1\ g_2]$.

8. The information transmission system of claim 1, wherein the first sensing device calculates a beamforming coefficient of the jamming signal such that a signal-to-interference-plus-noise ratio (SINR) of the transmission signal received by the information collection device is maintained to be greater than or equal to a predetermined value when the transmission signal and the jamming signal are transmitted.

9. The information transmission system of claim 8, wherein the at least one second sensing device generates the same jamming signal as that generated by the first sensing device, and transmits the jamming signal while the first sensing device transmits the jamming signal.

10. The information transmission system of claim 1, wherein, when the cooperation request signal is received from the first sensing device, the at least one second sensing device determines whether the at least one second sensing device will cooperate with the first sensing device by checking at least one among remaining battery power, an information transmission load, and network traffic thereof, and transmits the cooperation response signal to the first sensing device.

11. A device which transmits sensor information via a single antenna, the device comprising:

at least one processor;
a memory; and
at least one program,
wherein the at least one program is stored in the memory, and configured to be executed by the at least one processor,
wherein the at least one program comprises:
a command instructing to transmit a cooperation request signal;
a command instructing to receive a cooperation response signal corresponding to the cooperation request signal and generate a jamming signal on the basis of the cooperation response signal; and
a command instructing to generate a transmission signal including sensor information, and
the cooperation response signal comprises:
channel information between a second sensing device and an information collection device; and
a seed for a random signal generator shared between a first sensing device and the second sensing device, or
wherein the at least one program comprises:
a command instructing to receive a cooperation request signal from at least one sensing device adjacent to the device;
a command instructing to check whether the device will cooperate with the at least one sensing device on the basis of the received cooperation request signal, and control the device to generate a cooperation response signal including channel information between the device and the information collection device and transmit the generated cooperation response signal to the at least one sensing device; and
a command instructing to generate a jamming signal according to a beamforming coefficient calculated by the at least one sensing device and transmit the generated jamming signal to the information collection device.

12. The device of claim 11, wherein the at least one program comprises:

a command instructing to transmit a cooperation request signal;
a command instructing to receive a cooperation response signal corresponding to the cooperation request signal and generate a jamming signal on the basis of the cooperation response signal; and
a command instructing to generate a transmission signal including sensor information,
wherein the cooperation response signal comprises:
channel information between the second sensing device and the information collection device; and
a seed for a random signal generator shared between the first sensing device and the second sensing device.

13. The device of claim 12, wherein the command instructing to generate the jamming signal comprises a command instructing to, when the transmission signal and the jamming signal are transmitted, calculate a beamforming coefficient of the jamming signal such that a signal-to-interference-plus-noise ratio (SINR) of the transmission signal received by the information collection device is maintained to be greater than or equal to a predetermined value.

14. The device of claim 11, wherein the at least one program comprises:

a command instructing to receive a cooperation request signal from at least one sensing device adjacent to the device; and
a command instructing to check whether the device will cooperate with the at least one sensing device on the basis of the received cooperation request signal, and control the device to generate a cooperation response signal including channel information between the device and the information collection device and transmit the generated cooperation response signal to the at least one sensing device; and
a command instructing to generate a jamming signal according to a beamforming coefficient calculated by the at least one sensing device and transmit the generated jamming signal to the information collection device.

15. The device of claim 14, wherein the command instructing to generate and transmit the jamming signal comprises a command instructing to generate the same jamming signal as that generated by the first sensing device, and transmit the jamming signal while the sensing device transmits the jamming signal.

16. The device of claim 14, wherein the command instructing to check whether the device will cooperate with the at least one sensing device and transmit the cooperation response signal comprises a command instructing, when the cooperation request signal is received from the at least one sensing device, to determine whether the device will cooperate with the at least one sensing device by checking at least one among remaining battery power, an information transmission load, and network traffic of the device, and transmit the cooperation response signal to the at least one sensing device.

17. An information transmission method, performed by a first sensing device, comprising:

transmitting a cooperation request signal;
receiving a cooperation response signal corresponding to the cooperation request signal, and generating a jamming signal on the basis of the cooperation response signal; and
generating a transmission signal including sensor information,
wherein the cooperation response signal comprises:
channel information between a second sensing device and an information collection device; and
a seed for a random signal generator shared between the first sensing device and the second sensing device.

* * * * *